United States Patent [19]

Uesugi et al.

[11] Patent Number: 4,956,539

[45] Date of Patent: Sep. 11, 1990

[54] LASER PROCESSING METHOD

[75] Inventors: Yuji Uesugi, Osaka; Masashi Makino, Toyonaka; Yukio Nishikawa, Kobe; Kunio Oshima; Akihito Shinohara, both of Matsue, all of Japan

[73] Assignee: Matsushita Electric Industrial Co., Ltd., Kadoma, Japan

[21] Appl. No.: 180,820

[22] PCT Filed: Jul. 7, 1987

[86] PCT No.: PCT/JP87/00480

§ 371 Date: Apr. 18, 1988

§ 102(e) Date: Apr. 18, 1988

[87] PCT Pub. No.: WO88/00109

PCT Pub. Date: Jan. 14, 1988

[30] Foreign Application Priority Data

Jul. 9, 1986 [JP] Japan .............................. 61-161338
Aug. 7, 1986 [JP] Japan .............................. 61-186026

[51] Int. Cl.$^5$ .......................................... B23K 26/08
[52] U.S. Cl. ........................... 219/121.8; 219/121.85
[58] Field of Search ........... 219/121.8, 121.68, 121.69, 219/121.74, 121.82, 121.6, 121.85

[56] References Cited

U.S. PATENT DOCUMENTS 4,468,551 8/1984 Neiheisel ..................... 219/121.75 X
4,535,218 8/1985 Krause et al. .................. 219/121.68

FOREIGN PATENT DOCUMENTS 0140663 5/1985 European Pat. Off. ......... 219/121.8

Primary Examiner—C. L. Albritton
Attorney, Agent, or Firm—Cushman, Darby & Cushman

[57] ABSTRACT

A method for processing a work, which is running in a direction, by making reciprocal scanning of laser beams and by repeatedly processing substantially parallel processing lines. By determining the scanning velocity vector of the laser beam by operation of the running velocity vector of the work and the relative processing velocity vector to the work, the processing lines are effectively formed.

Furthermore, by inclining the work in a manner that the maximum angle made by the work and the laser beam is other than the right angle, the intensity of the laser beam is stabilized.

10 Claims, 11 Drawing Sheets

LASER PROCESSING METHOD

TECHNICAL FIELD

The present invention relates to laser processing method which physically or chemically processes a work running in a direction by scanning a laser beam thereon.

BACKGROUND ART

Scanning of the laser beam is necessary in case of repeatingly processing a tape-shaped work by laser beam, where work is running in a certain direction and that is repeatingly processed substantially parallel to a direction which is not the running direction.

Figure 1:
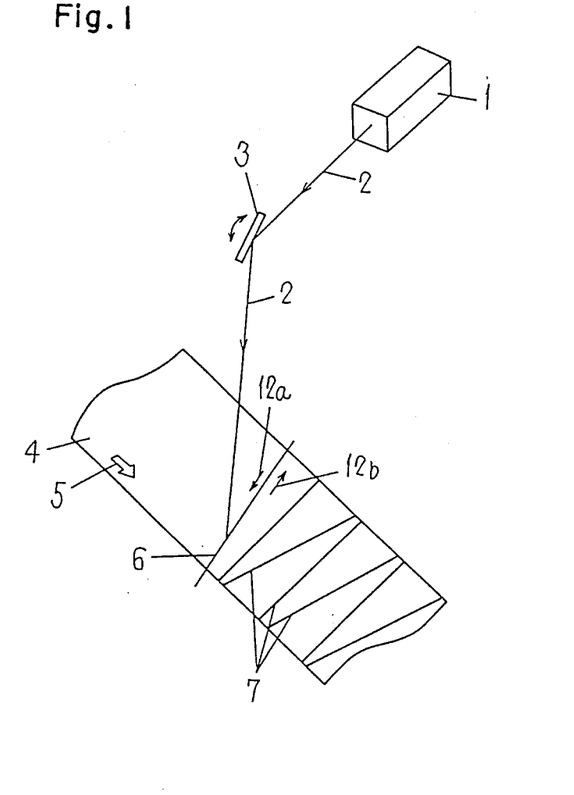
FIG. 1–FIG. 3 are the perspective views showing the conventional scanning methods a of laser beam.
Figure 2:
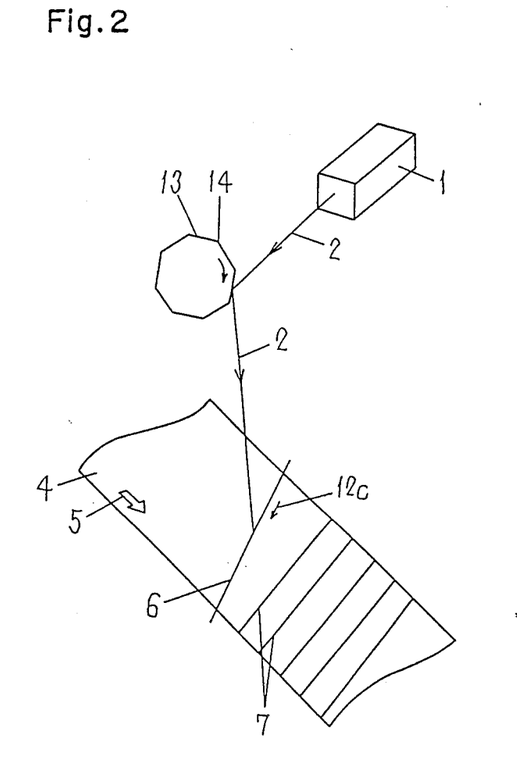

As a method for scanning the laser beam in a high velocity against a work, a method by galvanomirror or polygon mirror is known. FIG. 1 and FIG. 2 show the cases of scanning by the conventional galvanomirror or polygon mirror.

In FIG. 1, numeral 1 is a laser oscillator, numeral 2 is laser beam, numeral 3 is a galanomirror, numeral 4 is a work which runs in a direction of numeral 5. By the galvanomirror 3, the laser beam 2 is scanned as a scanning line 6. As the galvanomirror makes the reciprocating motion, the laser beam is scanned in the directions of the scanning directions 12a and 12b. As the work 4 runs in the direction of the numeral 5, on the work, the processing line is formed zigzag like numeral 7.

Accordingly, in order to obtain a processing condition in which the processing lines 7 are substantially parallel, it is suitable to make the running velocity of the work slow, or inversely, to make the scanning velocity of the laser beam fast; but the former is inferior in efficiency of the processing, and the latter has a limit due to the processing ability by the laser beam.

Similarly, FIG. 2 shows the case that the laser beam is scanned by a polygon mirror 13. The scanning line of this case is numeral 6, and the scanning direction is one given direction of the numeral 12c. As a result, the processing lines 7 become parallel, but it has a demerit that the laser beam 2 cannot be used due to the power reduction when a part of the laser beam 2 is reflected by the edge 14 of the polygon mirror Generally, in case of adopting the conventional scanning method of using a galvanomirror or polygon mirror, there is a problem that only about 50% of time can effectively be used for scanning.

Furthermore, in the case of applying, physical processing such as removing processing or heat treatment or chemical processing for making chemical change by scanning the laser beam against a flat work it is a conventional method to dispose the work vertically against the laser beam at the center of the scanning.

Figure 3:
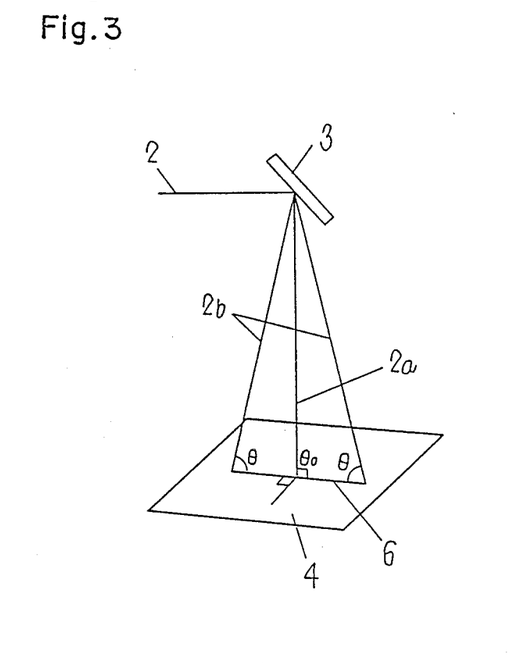

FIG. 3 is a perspective view showing a conventional scanning method. As shown in the figure, since a work 4 is disposed vertically against a laser beam 2a at the center of the scanning, an angle $\theta_0$ which is made by the laser beam 2a and the work 4 is 90°. When the laser beam is scanned along the scanning line 6, the angle $\theta$ made by the laser beam 2b and the work 4 is changed, and the angle $\theta$ is reduced as departing from the center of the scanning.

In the above-mentioned constitution, there are problems as set forth in the following:

(1) As the angle $\theta$ made by the laser beam 2b and the work 4 varies at respective points on the scanning line 6, the shape of the laser beam spot largely varies. Namely, the shapes of the spot are circular at the center of the scanning and ellipse at a point apart from the center of the scanning, and the ellipticity of the shape increasesas departing more from the center of the scanning, namely as the angle $\theta$ decreases. Since the variation of the spot shape varies the energy density of the laser beam largely, that, is a large factor to deteriorate the stability of the laser processing. Besides, because of the above-mentioned reason, it is not possible to make the length of the scanning line 6 very large.

(2) When the angle made by the laser beam and the work is around 90°, it is likely that such returning light is generated that a part of the laser beam emitted to the work is reflected and passes through the scanning mirror 2 and to the laser oscillator. This returning light becomes remarkable when the work is a material having high reflection coefficient, such as cupper, aluminum or the like. When the returning light returns to the medium of the laser oscillation, the laser beam is amplified or damped depending on its phase, so that the intensity of the laser beam becomes unstable, and it badly influences the processing.

SUMMARY OF THE INVENTION

Accordingly, the main purpose of the present invention is to provide a laser processing method which can do the laser beam scanning effectively in case of obtaining substantially parallel processing lines almost continuously crosswisely on a work.

Another purpose of the present invention is to improve the stability of the laser processing by reducing the variation of the energy density of the laser beam by reducing the variation of the angle made by the laser beam and the work.

The above-mentioned purposes of the present invention are achieved by scanning the laser beam by determining vectors $\vec{V}_1$ and $\vec{V}_2$ so as to be $\vec{V}_1 = \vec{V}_a + \vec{v}$, $\vec{V}_2 = -\vec{V}_a + \vec{v}$, provided that the running velocity vector of the work is set as $\vec{V}$, the relative processing velocity vector against the work on an outward way is set as $\vec{V}_a$ the, speed vector of the laser beam scanning on the outward way is $\vec{V}_1$ and the velocity vector of the laser beam scanning on inward way is set as $\vec{V}_2$.

Also, the present invention includes a method that vector components of the scanning velocity in the running direction of the aforesaid work are substantially equal both on the outward way and on the inward way of the laser beam, and vector components in directions of right angles to the running direction of the above-said work are respectively opposite each other and are of substantially equal values to each other.

Furthermore, the present invention includes a method for processing a work by inclining it so that the maximum angle made by the laser beam and the work is an angle which is other than a right angle.

BRIEF DESCRIPTION OF THE DRAWINGS

FIG. 7(a), (b); FIG. 8(a), (b) and FIG. 9(a), (b) are drawings showing the relation between scanning and running vector in the present invention;

BEST MODE FOR EMBODYING THE INVENTION

Figure 4:
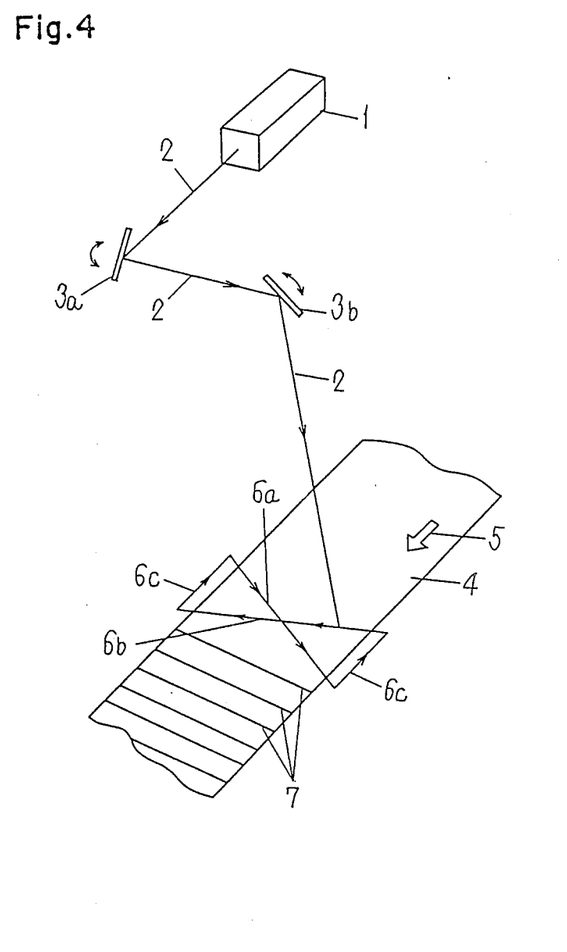
FIG. 4 is a perspective view showing a first embodiment of the present invention.

Hereinafter, an embodiment of the present invention is described with reference of the attached drawings. FIG. 4 is a perspective view showing a first embodiment of the present invention. A laser beam 2 from a laser oscillator 1 is scanned by a pair of galvano-mirrors 3a and 3b, and it's locus of the scanning is an order of scanning lines 6a→6c→6b→6c→6a. The scanning lines 6a of an outward way and 6b of an inward way have components in the running direction 5 of the work 4 and components in a direction at right angle to the running direction. When the scanning is on the scanning lines 6a and 6b, respective processing line 7 on the work 4 becomes susbtantially parallel. Since the scanning lines 6a, 6b are straight lines and of uniform velocity scanning and further having vector components of scanning velocity equal to the running velocity of the work, the processing lines 7 become straight and completely parallel. The scanning lines 6c in a reversal direction of the above-said running direction 5 of the work return to the initial positions of the scanning lines 6a and 6b, under the condition not scanning on the work 4. Therefore, the scanning can repeatingly be done in the order of scanning lines 6a→6c→6b→6c→6a by the operation, and thereby parallel processing lines can continuously be obtained on the work 4. The distance between the processing lines 7 can arbitrarily be set by combination of form of scanning, scanning velocity of the scanning lines 6a, 6b, 6c and the running velocity of the work. Usually, by selecting the scanning of the scanning line 6c to be about 4 msec of minimum response time of the galvanomirror 3, the running velocity of the work 4 can be taken larger, and the ratio of time to be effectively used for processing in the total scanning time becomes large. In case of the present embodiment, more than 85% could effectively be used.

Figure 5:
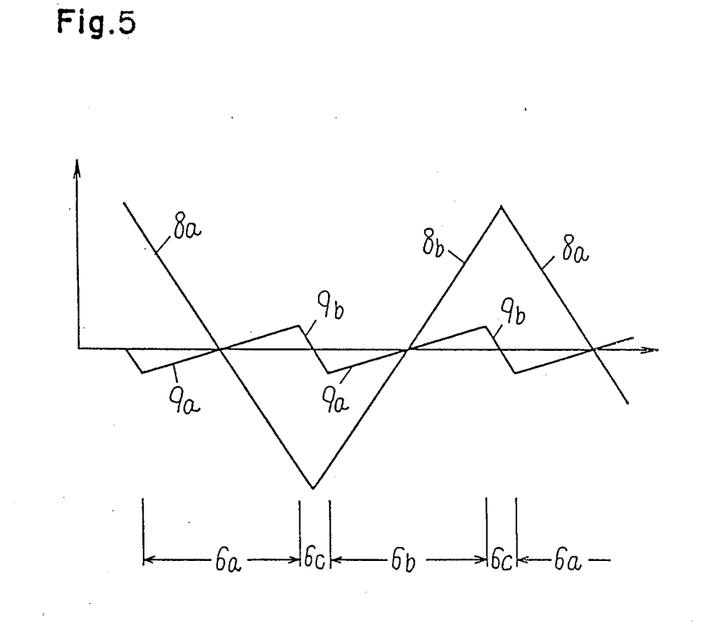
FIG. 5 is a drawing showing a timing chart of a galvanomirror of the embodiment.

FIG. 5 shows a time chart of a galvanomirror as an apparatus for embodying the laser beam scanning method of the present embodiment. To describe the relation between the galvanomirror 3a and 3b in FIG. 4, the galvanomirror 3a in the FIG. 4 is a galvanomirror which makes sub-scanning 9a and 9b in FIG. 5. The galvanomirror 3b in FIG. 4 is a galvanomirror which makes main scanning 8a and 8b in FIG. 5. The relation between the combination of the main scanning 8a and 8b and the sub-scanning 9a and 9b in FIG. 5 and the scanning lines 6a, 6b, 6c in FIG. 4 is shown at the lower part of FIG. 5. Therein, the main scanning in FIG. 5 is changing as 8a⇌8b during the sub-scanning 9b, the scanning line 6c in FIG. 4 becomes a convex curve to the outer side. For getting a straight line as shown by the scanning line 6c in FIG. 4, the main scanning in FIG. 5 needs to be of a constant angle (under the condition that the galvanomirror for main scanning is stopping) during the sub-scanning 9b; but the galvanomirror for main scanning has force of inertia, and hence, linearity of the processing line is improved by programming as triangular waves like 8a→8b→8c as shown in FIG. 5.

Though, the above-mentioned scanning is possible if the rotative shafts of the galvanomirrors for main scanning and sub-scanning are not parallel each other, it is easier to set a program when the rotation shafts maks a right angle to each other.

Further, the main scanning 8a, 8b and sub-scanning 9a, 9b may be swinged by sine curves, besides the method for swinging the galvanomirrors in uniform angular velocity as shown in FIG. 5. But, in this case, the linearlity of the processing lines 2 become a little worse.

Figure 6:
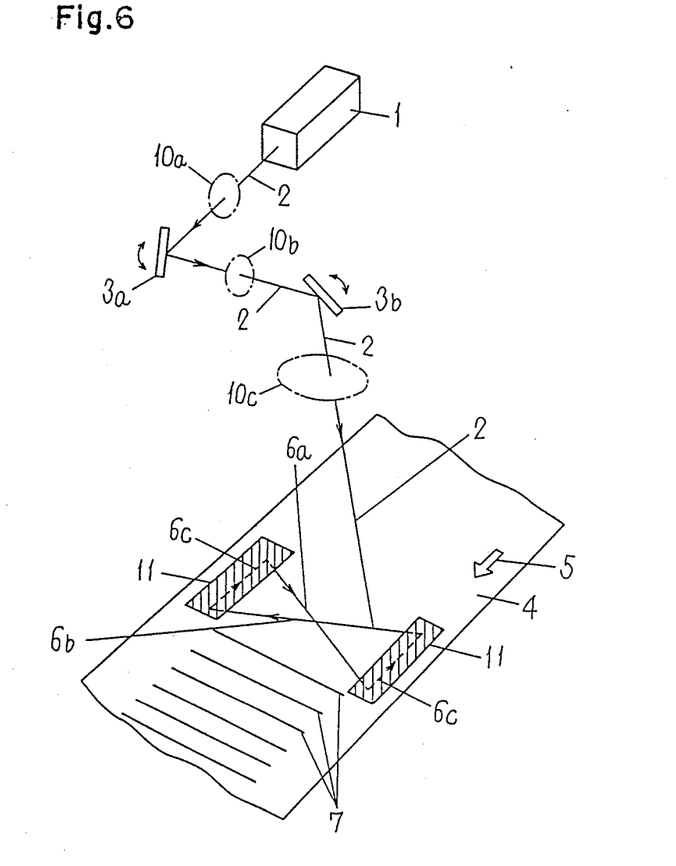
FIG. 6 is a perspective view showing a second embodiment of the present invention.

FIG. 6 is a perspective view showing a second embodiment of the present invention. The constitution is substantially the same as that of FIG. 4, but the present embodiment is different in such a point to provide a mask 11 on a wide work 4. When the scanning line 6C must not be irradiated on the work, there are other methods for stopping the irradiation, such as a method of high velocity switching using acoustoptical device, or a method using opening-closing of a mechanical shutter. Though, the acoustoptical device has high velocity response, it is expensive, and the mechanical shutter has a disadvantage that the response time is such slow as several 10 to several 100 msec. In the present invention, the laser beam on the scanning line 6C which scans the reversal direction of the running direction of the work is masked so as not to be irradiated on the work 4. The mask 11 is preferably that which is not injured by the laser beam 2 and does not make diffused reflection of the laser beam, but any one is acceptable when the work is not processed by the diffused reflected laser beam. For example, ceramics, SUS plate, graphite and the like can be used. Mask 11 may be fixed between the work 4 and the galvanomirror 3b, but it is desirable to fix the mask 11 to a position near to the work 4 so as to reduce the influence of diffraction of the laser beam by the mask 11.

By the above-mentioned constitution, it is possible to obtain substantially parallel prcessing lines effectively on the wide work.

Hereupon, when the width of the processing line 7 is such smaller as several 100 $\mu$ or less, generally a condenser lens is used. Even though any position of the condenser lenses 10a, 10b, 10c is selected as a position of the condenser lens, effective laser beam scanning, which is the effect of the present invention, is possible.

Though, all of the above-mentioned embodiments are to obtain processing lines in a direction of a right angle to the running direction 5 of the work 4 in parallel and continuously, it is possible to obtain processing lines which are inclined by an arbitrary angle to the direction at a right angle with the running direction 5 of the work. A way to get a laser beam scanning vector for the case of obtaining incined processing lines having an arbitrary inclining angle in parallel and continuous way is shown in FIGS. 7(a) and (b) and FIGS. 8(a) and (b).

Figure 7:
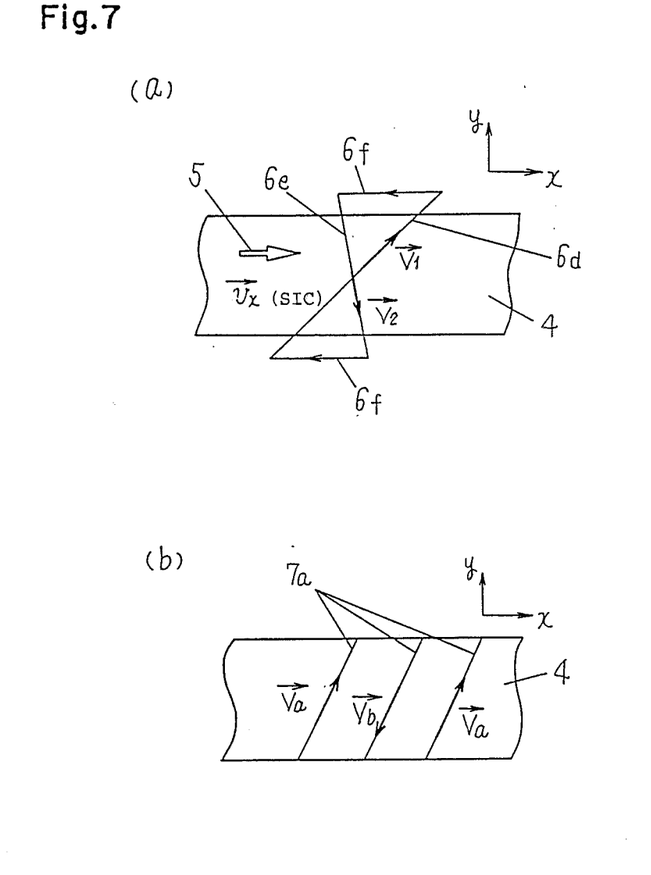

In FIG. 7(a), $\vec{V}_1$ and $\vec{V}_2$ respectively show the scanning velocity vector of the laser beams scanning on the scanning lines 6d and 6e, and $\vec{v}$ shows the running velocity vector of the work 4. And, in FIG. 7(b), $\vec{V}_a$ and $\vec{V}_b$ respectively show processing velocity vectors by laser beams scanning on the scanning lines 6d, 6e in case of seeing relatively relative to the work. Now, the running direction 5 of the work is taken as the X-axis, and a direction at right angle with this it is taken as the Y-axis.

Figure 8:
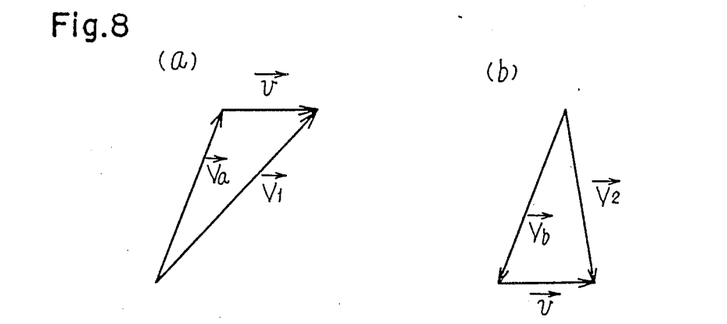

FIGS. 8(a) and (b) show the relations of respective vectors. The relations of the respective vectors are shown in the following by the equations.

$$\vec{V}_1 = \vec{V}_a + \vec{v} \quad (1)$$

$$\vec{V}_2 = \vec{V}_b + \vec{v} \quad (2)$$

And also, because of $\vec{V}_a$ and $\vec{V}_b$ being parallel and their directions opposing with each other, and relative processing velocity against the work being constant, the following relations are established.

$$\vec{V}_b = -\vec{V}_a \quad (3)$$

From equation (2) and equation (3)

$$\vec{V}_2 = -\vec{V}_a + \vec{v} \quad (4)$$

Next, the velocity vectors ar shown by using components in the X direction and the Y direction, and the equation of thier relations are obtained.

At first, the components in the X direction and Y direction of, each velocity vectors are shown as:

$$\vec{V}_1 = (V_{1x}, V_{1y}), V_2 = (V_{2x}, V_{2y}),$$
$$\vec{V}_a = (V_{ax}, V_{ay}), V_b = (V_{bx}, V_{by}), \quad (5)$$
$$\vec{v} = (v_x, 0)$$

The equation (1) shown by (5) is, $$(V_{1x}, V_{1y}) = (V_{ax}, V_{ay}) + (V_x, 0) \therefore V_{1x} = V_{ax} + v_x \quad (6)$$

$$V_{1y} = v_{ay} \quad (7)$$

The equation (4) shown by (5) is, $$(V_{2x}, V_{2y}) = -(V_{ax}, V_{ay}) + (V_x, 0) \therefore V_{2x} = -V_{ax} + v_x \quad (8)$$

$$V_{2y} = -V_{ay} \quad (9)$$

In the above-mentioned first embodiment of the present invention, as the processing lines make a right angle to the running direction 5 of the work, $\vec{V}_a$ is in a direction to make a right angle to the running direction 5 of the work, and it corresponds to a case that the component of $\vec{V}_a$ in the work running direction is 0, namely $V_{ax} = 0$. At this time, by the equation (6), $$V_{1x} = v_x \quad (10)$$

and from the equation (8), $$V_{2x} = v_x \quad (11)$$

Figure 9:
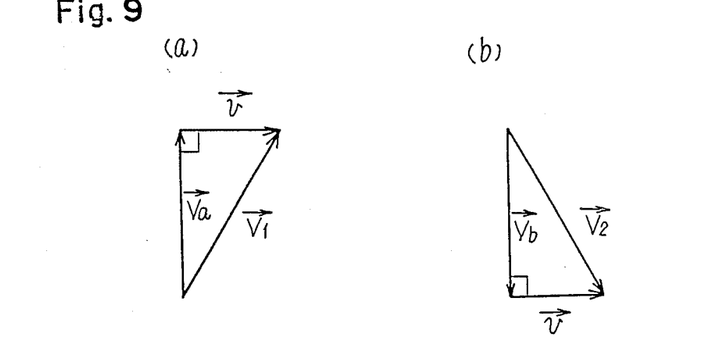

FIGS. 9(a) and (b) are the drawings showing the relations of respective velocity vectors at this time.

Next, a third embodiment of the present invention is described with reference to FIG. 10 and FIG. 11.

The third embodiment of the present invention is to attempt to control the variation of the energy density of the beam spot and to stabilize the processing, by selecting the angle made by the laser beam and the work to be an angle other than a right angle in the methods in the first and the second embodiment of the present invention.

Figure 10:
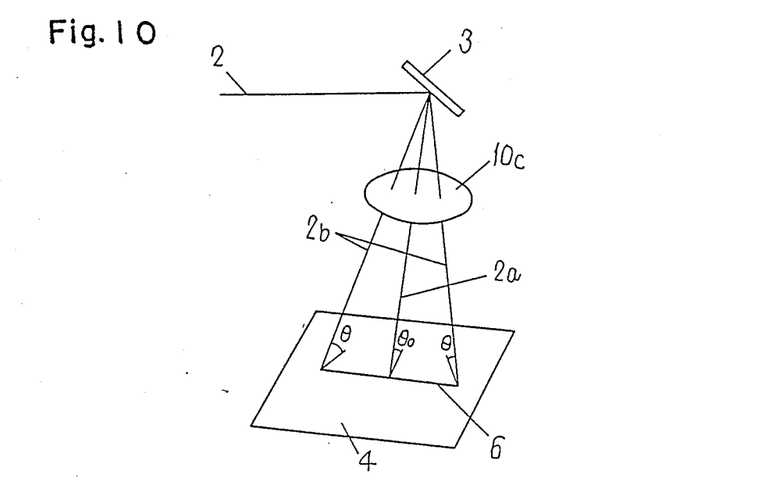
FIG. 10 is a perspective view showing a third embodiment of the present invention.
Figure 11:
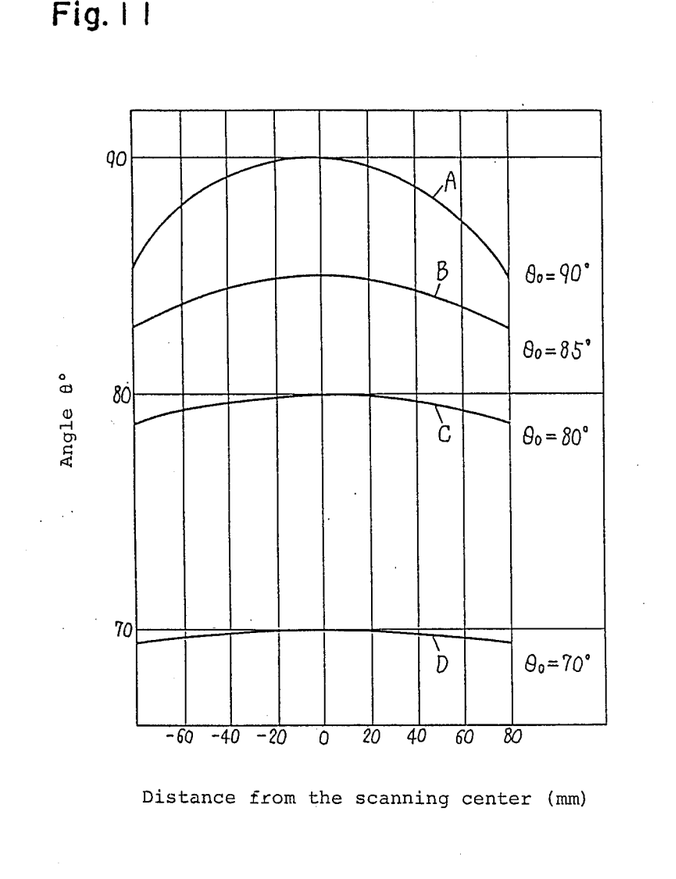
FIG. 11 is a drawing showing a relation between an angle made by a laser beam and a work and the distance from the scanning center of the laser beam in the embodiment.

FIG. 10 and FIG. 11 show a laser processing method in the third embodiment of the present invention. In FIG. 10, the laser beam 2 is scanned by the scanning mirror 3, and irradiated on the work 4 by a condenser lens 10c. Against the laser beam 2a at the scanning center, the work 4 is disposed by being relatively inclined. When the laser beam is scanned along the scanning line 6, the angle $\theta$ made by the laser beam and the work 4 becomes a maximum angle $\theta_0$ for the state of laser beam 2a at the scanning center. And the angle $\theta$ becomes smaller as the laser beam departs from the laser beam 2a at the scanning center. FIG. 11 is an example showing the mode of change of the angle $\theta$ in case of using an f$\theta$ lens as the condenser lens 10c. This case shows the change of the angle $\theta$ under the condition that the focal length of the condenser lens 10C is 300 mm, the distance from the scanning mirror 3 to a principal point of the condenser lens 10C is 200 mm. A curve A, in case of the angle $\theta_0$ is 90° in FIG. 11, shows the conventional scanning method in which the work is not relatively inclined to the laser beam. From this, it is understand that the angle $\theta$ is largely changed by scanning in the scanning method of non-inclining of the work. On the other hand, in the case of the present invention where the work is relatively inclined, the change of the angle $\theta$ can be reduced which is understood from the curves B, C and D. The curves B, C and D are the cases of changing only the relative inclining angle of the work while using the same optical system as that of the curve A. Furthermore, by the present invention, as the angle made by the laser beam and the work the angle around 90° can be avoided, and therefore it is possible to get rid of unstability of the laser power due to the return light from the work.

And, it is most effective as a laser processing to scan the work with inclination so as to make the angle $\theta$ made by the laser beam and the work be in a range of 87°–55°. That is, when the angle $\theta$ is 90°–87°, the influence due to the return of the light becomes large, and when the angle $\theta$ is 55° or smaller, the shape of the spot of the laser becomes an ellipse of large ellipticity, and therefore the efficiency of the processing becomes worse.

Thus, according to the above-mentioned embodiment, the change of the angle $\theta$ made by the laser beam and the work in the scanning becomes small, by disposing the work with inclination relatively so that the angle made by the laser beam and the work have an angle which is not the rigth angle. Thereby, the change of the shape of the spot on the work becomes small, and as a result, stable laser processing becomes possible. Furthermore, it is possible to get rid of an unstable factor of the laser output due to the influence of the return light from the work.

Next, a fourth embodiment of the present invention is described with reference to a drawing.

Figure 12:
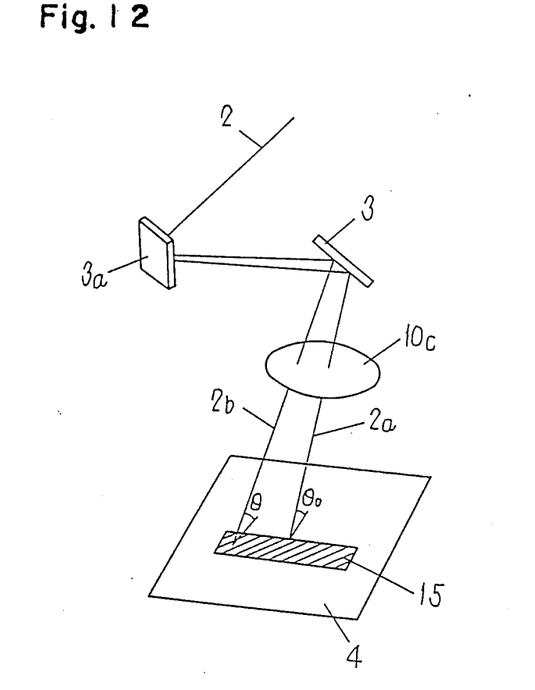
FIG. 12 is a perspective view showing a fourth embodiment of the present invention.

FIG. 12 shows the fourth embodiment of the present invention, and it is different from FIG. 10 for the third embodiment, at the point of disposing the scanning mirror 3a. As the work 4 is relatively inclining to the laser beam, the angle $\theta$ made by the laser beam and the work 4 becomes maximum at the angle $\theta_0$ at the position of the laser beam 2a.

As mentioned above, according to the present embodiment, by disposing the scanning mirror 3a and inclining the work relatively, the area being able to be scanned on the work becomes the scanning plane 15. As the scanning area is a plane, either one of the laser beam 2a or 2b makes defocusing on the work, the defocusing can be reduced by inclining the condenser lens appropriately or making appropriate aberration on the condenser lens.

POSSIBLE UTILITY IN INDUSTRY

As is obvious from the above-mentioned explanation, it is possible to form the substantially parallel processing lines effectively on the work by determining the scanning velocity vector of the laser beam by operation of the running velocity vector of the work and the relative processing velocity vector against the work and by making repeated outward and inward scannings.

Furthermore, by processing with inclining of the work so that the maximum angle made by the work and the laser beam becomes an angle which is not the right angle, it is possible to stabilize the intensity of the laser beam, and the stability of the processing is improved.

What is claimed is:

1. A laser processing method comprising the steps of:
   processing a work, which is running in a direction, by reciprocal way scanning a laser beam and by repeatedly processing substantially parallel processing lines having a given angle to the running direction of said work, provided that the running velocity vector of said work is set as $\vec{v}$, the relative processing velocity vector against said work in a first way is set as $\vec{V}_a$, the scanning velocity vector of the laser beam on the first way is set as $\vec{V}_1$, and the scanning velocity vector of the laser beam on a second way is set as $\vec{V}_2$,
   scanning the laser beam by determining $\vec{V}_1$, $\vec{V}_2$, in a manner to hold:

$$\vec{V}_1 \approx \vec{V}_a + \vec{v}, \vec{V}_2 \approx -\vec{V}_a + \vec{v}, \text{ and}$$

inclining the work in a manner that the angle made by the laser beam and the work is in a range of 87° to 55°.

2. A laser processing method comprising the steps of:
   running a work in a direction at a running velocity; and
   irradiating a laser beam to a pair of galvanomirrors at substantially the same time, scanned along parallel and consecutive processing lines on the work having a given angle to the running direction of the work by repeating a series of vectors $\vec{V}_1$, $-\vec{v}$, $\vec{V}_2$ and $-\vec{v}$ and holding the relation of $$\vec{V}_1 \approx \vec{V}_a + \vec{v}, \vec{V}_2 \approx -\vec{V}_a + \vec{v},$$

where v is the running velocity vector of the work, $V_a$ is the relative processing velocity vector against the work, $V_1$ is the scanning velocity vector of the laser beam in a first direction, and $\vec{V}_2$ is the scanning velocity vector of the laser beam in a second direction.

3. A laser processing method comprising the steps of:
   running a work in a direction at a running velocity;
   irradiating a laser beam to a pair of galvanomirrors at substantially the same time, scanned along parallel and consecutive processing lines on the work having a right angle to the running direction of the work by repeating a series of vectors $\vec{V}_1$, $-\vec{v}$, $\vec{V}_2$ and $-\vec{v}$, wherein $\vec{v}$ is the running velocity vector of the work, $\vec{V}_a$ is the relative processing velocity vector against the work, $\vec{V}_1$ is the scanning velocity vector of the laser beam in a first direction, and $\vec{V}_2$ is the scanning velocity vector of the laser beam in a second direction and wherein:

vector components of $\vec{V}_1$ and $\vec{V}_2$ in the running direction of the work are substantially equal in magnitude to the running velocity of the work and
   vector components of $\vec{V}_1$ and $\vec{V}_2$ in a direction at a right angle to the running direction of the work are at opposite directions to each other and are substantially equal in magnitude to each other.

4. A laser processing method comprising the steps of:
   running a work in a direction at a running velocity;
   irradiating a laser beam to a pair of galvanomirrors at substantially the same time, scanned along parallel and consecutive processing lines on the work having a given angle to the running direction of the work and holding the relation of $$\vec{V}_1 \approx \vec{V}_a + \vec{v}, \vec{V}_2 \approx -\vec{V}_a + \vec{v}$$

where v is the running velocity vector of the work, $\vec{V}_a$ is the relative processing velocity vector against the work, $\vec{V}_1$ is the scanning velocity vector of the laser beam in a first direction and $\vec{V}_2$ is the scanning velocity vector of the laser beam in a second direction; and
   inclining the work in a manner that the maximum angle made by the laser beam and the work is of an angle other than a right angle.

5. A laser processing method in accordance with claim 4, wherein:
   the laser beam is scanned in a manner that the angle made by the laser beam and the work is in a range of 87° to 55°.

6. A laser beam processing method comprising the steps of:
   running a work in a direction at a running velocity and inclining the work to an angle made by the work and a laser beam in a range of 87° to 55°;
   scanning the laser beam along parallel and consecutive processing lines on the work having a given angle to the running direction of the work by reciprocally determining $\vec{V}_1$ and $\vec{V}_2$ according to the relation:

$$\vec{V}_1 \approx \vec{V}_a + \vec{v}, \vec{V}_2 \approx -\vec{V}_a + \vec{v}$$

where the running velocity vector of the work is $\vec{V}$, the relative processing velocity vector against the work is $\vec{V}_a$, the scanning velocity vector of the laser beam in a first direction is $\vec{V}_1$ and the scanning velocity vector of the laser beam in a second direction is $\vec{V}_2$.

7. A laser beam processing method comprising the steps of:
   running a work in a direction of a running velocity;
   scanning a laser beam along parallel and consecutive processing lines on the work having a given angle to the running direction of the work by reciprocally determining the scanning velocity vector of the laser beam in a first direction across the work, $\vec{V}_1$, and the scanning velocity vector of the laser beam in a second direction across the work, $\vec{V}_2$, according to the relation:

$$\vec{V}_1 \approx \vec{V}_a + \vec{v}; \text{ and } \vec{V}_2 \approx -\vec{V}_a + \vec{v},$$

where $\vec{V}_a$ is the relative processing velocity vector of the laser beam on the work and $\vec{v}$ is the running velocity vector of the work; and inclining the work relative to the laser beam so the angle made between the vector v and the laser beam is other than 90°.

8. A method according to claim 7, wherein the scanning step includes the step of:

irradiating the laser beam to a pair of galvanomirrors.

9. A method according to claim 7, wherein the work is inclined so the angle made between the vector v and the laser beam is in the range of 87° and 55°.

10. A laser processing method according to claim 7, wherein:

vector components of $\vec{V}_1$ and $\vec{V}_2$ in the running direction of the work are substantially equal in magnitude to each other and vector components of $\vec{V}_1$ and $\vec{V}_2$ in the direction at a right angle to the running direction of the work are at opposite directions to each other and are substantially equal in magnitude to each other.

* * * * *